United States Patent Office

3,708,432
Patented Jan. 2, 1973

3,708,432
NUCLEAR FUEL
Leonard V. Triggiani, Rockville, Norton Haberman, Bethesda, and Moises G. Sanchez, Severna Park, Md., assignors to W. R. Grace & Co., New York, N.Y.
No Drawing. Continuation-in-part of application Ser. No. 647,606, June 21, 1967. This application Aug. 28, 1969, Ser. No. 853,980
The portion of the term of the patent subsequent to Mar. 17, 1987, has been disclaimed
Int. Cl. C09k 3/00
U.S. Cl. 252—301.1 S       8 Claims

ABSTRACT OF THE DISCLOSURE

A process for preparing a nuclear fuel containing small amounts of inorganic ions by impregnating formed particles with inorganic salts.

---

This application is a continuation-in-part of application Ser. No. 647,606, filed June 21, 1967, now Patent No. 3,501,411.

This application relates to a process for preparing a nuclear fuel that contains small but significant amounts of ions of Group II, Group III, and the transition elements (atomic numbers 21 through 80), such as zirconium, yttrium, aluminum, and magnesium, for example.

In recent years, oxides of actinide metals have been of paramount importance in the field of nuclear fuel development. These oxides may be used in the form of pellets or may be in the form of a regular granule which can be packed to high density. The fabrication of these oxide particles into dense form from ceramic powder requires compaction of pellets followed by prolonged sintering at extreme temperatures.

Uranium dioxide is one of the better known oxide fuels and is also used as one of the components of composite fuels such as thoria-urania, urania-plutonia, etc. Some of the problems encountered in the preparation of these fuels have been solved in recent years by the development of processes for the preparation of microspheres. These microspheres eliminate the principal disadvantages of preparation of the fuel elements by the older techniques.

It is frequently desirable to add some quantities of inorganic ions such as zirconia for example to urania and plutonia fuels. Zirconia serves two purposes. First, it is an inert diluent in situations where it is desirable to add an inert material to the fuel. The low cross section of zirconia makes it particularly desirable from the standpoint of neutron economy. In addition, zirconia is frequently added to urania and plutonia fuels to improve the strength properties of the fuel. The fact that zirconia adds improved strength properties to the fuel has been known for some time. Other ions such as yttrium, aluminum, and magnesium, for example, may be substituted for zirconium as the additive. The principal criterion is that the metal ion must have a low cross section for neutron economy.

We have developed a novel process for preparing fuels of this type. For purposes of simplicity, our process will be described as our preferred microsphere impregnation process. However, it is obvious that the process is applicable for preparing fuels in any desirable physical form. Our preferred process comprises the following steps:

(1) Selection and disollution of the fuel raw materials.
(2) Peparation of sols of these materials.
(3) Formation of microspheres from the sols.
(4) Washing and drying the micospheres.
(5) Introducing the additive into the microsphere product.
(6) Sintering the microsphere containing the additive to the desired temperature.

In the first step of our process, the material to be used as a fuel as well as the inorganic ion are selected. The nuclear fuel may be a mixed oxide nuclear fuel. In addition to thoria-urania (U–238) fuel, the fuel may contain fissionable materials. The fuel may be a thoria U–233 or U–235 composite, a urania (238) U–233 or U–235 composite or a urania (238) plutonia composite. The inorganic ion may be any element having a low cross section (fission capture or both). The elements of Group II, Group III, and the transition elements (atomic numbers 21 through 80) are preferred. This material is prepared in solution form for introduction into the microspheres at a later stage of the process. In the first step of our process, the urania or other actinide element component is dissolved to prepare a solution of nitrate, chloride, etc. In the second step of the process, the solution is converted to sol form. Suitable sols can be prepared by gradually removing anions from a dilute solution of the actinide metal salts, while maintaining the system at elevated temperatures. The preferred techniques suitable for anion removal are:

(1) Electrodialysis using anion permeable membranes.
(2) Dialysis using anion permeable membranes.
(3) Ion exchange using resin in hydroxide form.
(4) Peptization of washed hydroxides with an acid.
(5) Electrodialysis of solutions, the anions of which are oxidized to a volatile compound or state.

In the next step of the process, the sols are converted to microspheres. The method of preparing these microspheres is not part of this invention. It is covered in copending application Ser. No. 541,519, filed Apr. 11, 1966, now U.S. Patent 3,331,785.

This patent describes several suitable methods of preparing microspheres. Briefly, the preferred process comprises forming the sols into droplets and drying the sols in a column of solvent passed in countercurrent direction to the sol particles. The formed microspheres are removed from the bottom of the column and washed. The washed microspheres are dried and the microspheres in the size range desired for the preparation of our product are selected by separation using sieves having openings in the desired range.

In cases where it is desirable, microspheres or larger sized spheroids can be prepared directly from a solution. In this process, a solution of a salt of the matrix material is admixed with a water soluble resin that increases in viscosity in an alkaline medium. The droplets of solution are fed into an aqueous alkaline solution to form microspheres or spheroids. The particles are recovered and dried.

In some cases, urania microspheres may be hyperstoichiometric in oxygen at this stage and must be reduced to the dioxide if the final microspheres are to be free of interparticle sludge, etc. The reduction can be carried out using a suitable technique such as hydrogen reduction, etc. The micropheres are weighed and separated into batches of desired size to facilitate the next step of the process.

The inorganic ion is incorporated into the microspheres by an impregnation technique. This is done by preparing a solution of a salt of the inorganic ion. In the preparation of zirconium containing microspheres, for example, the solution of a zirconium salt is prepared in a concentration sufficiently high to give the desired zirconium content to the microspheres. The zirconium solution is added in an amount sufficient to fill the internal pores and bring the spheres to incipient wetness. This step is conveniently carried out in an atmosphere of an inert gas such as argon, for example. This protects the urania from oxidation, and, if necessary, can be used to provide part of the agitation during the impregnation step. This impregnation may be carried out in any suitable manner.

A suitable laboratory method is to divide the urania into 20 gram batches. Each of the batches of the microspheres is transferred to a fritted disc filter funnel and an atmosphere of argon is passed upwardly through the microspheres. The impregnation solution is made up to contain the desired amount of zirconium or other impregnant. This solution is admitted dropwise from a burette into contact with the microspheres with suitable stirring to be sure that the solution is distributed uniformly over the micropsheres.

After the impregnation step, the spheres are dried in a vacuum drier over a period of 10 hours. The temperature is increased from room temperature to 120° C. over this period. The best results are obtained when the spheres are dried in steps and are maintained at drying temperature for a period of about 2 hours. The impregnated spheres are then ready for sintering. A suitable sintering cycle for zirconium impregnated microspheres, for example, comprises sintering in hydrogen at 500° C. for a period of 3 hours, followed by increasing the temperature to the range of 1100 to 1300° C. for ½ to 3 hours.

Obviously, changes can be made in the impregnation technique. In certain cases, it will be desirable to impregnate the microspheres with inorganic ions that have physical properties that make it difficult to use the conventional solution impregnation technique described above. If, for example, it was desirable to impregnate the microspheres with a volatile inorganic ion, the spheres could be sintered to about 90 percent of density, impregnated and the final sintering completed. The spheres could also be completed using gaseous systems as well as the liquid system described above.

The sintering time and temperature depends on the final density achieved in the product. With zirconium, for example, suitable densities can be achieved by heating at temperatures as low as 1100° C. for a period as short as 30 minutes. The density can be greatly increased by increasing the temperature to 1300° C. and maintaining his temperature for a period of 80 minutes.

Our invention is further illustrated by the following pecific but non-limiting examples.

EXAMPLE 1

This example describes a process for preparing urania microspheres suitable as a base material in our preparation.

The microspheres were prepared by drying $UO_2$ sol droplets by settling the droplets through a countercurrent solvent of controlled temperature and water content. The equipment used was a column 7 feet long and 3 inches in diameter, equipped with a conical bottom for collecting the dried spheres which settled through the solvent mixture. A 50 liter three-necked Stewart distillation flask was fitted with a condenser and solvent water separator and was used for water removal from the system. The separated solvent was returned to the pot and distillate water either discarded or controlled amounts were returned to the pot as required to maintain a given water content or to control the distillation temperature.

A sol was prepared by the electrodialysis technique from uranyl chloride solution and was concentrated to a urania content of 10 weight percent. This sol was injected into the top of the column containing n-hexanol. The column was operated at an inlet temperature of 98° C. and an outlet temperature of 63° C. The hexanol was passed through the column at the rate of 700 ml. per minute.

The sol was injected centrally at the top of the column and the spheres were collected in the cone at the bottom of the column.

The microspheres were washed and dried. The spheres were separated as to size using a sieve to separate the spheres in the 60 to 80 micron size range. The spheres were then reduced in an atmosphere of hydrogen for a period of 4 hours and were weighed into 20 gram batches in an argon filled dry box.

EXAMPLE 2

The microspheres were impregnated using the following technique:

The porosity of the spheres was determined, and it was found that 5.65 ml. of solution would be sufficient to bring the spheres to incipient wetness. A zirconium nitrate solution was prepared to provide sufficient zirconium in this quantity of solution to prepare a product containing between 6 and 7 weight percent zirconium. The microspheres were transferred to a fritted disc filter funnel. The bottom of the funnel was fitted with an argon supply tube and the argon was turned on before the microspheres were transferred to the funnel. The zirconium nitrate impregnating solution was admitted dropwise from a burette. The contents of the funnel were stirred manually and with the gas stream as the impregnating solution was being added. After all the impregnating solution was added, the spheres were immediately placed in a vacuum drier with no further treatment. The spheres were dried using the following schedule:

The oven was heated to a temperature of 40° C. and maintained at that temperature for 2 hours. The temperature was then increased to 60° C. for 2 hours, followed by an increase to 80° C. for 2 hours, and an increase to 100° C. for 2 hours with final drying at 120° C. for 2 hours.

The microspheres were sintered in an atmosphere of hydrogen by bringing the furnace to a temperature of 500° C. and maintaining that temperature for a period of 3 hours. The microspheres were then densified by heating to 1300° C. for a period of 80 minutes. The final product contained about 6.5 to 7.0 percent zirconia.

EXAMPLE 3

This example illustrates the preparation of microspheres containing inorganic ions other than zirconia. Urania microspheres were impregnated using a general technique described in Example 2 above. Solutions of yttrium, magnesium, and aluminum salts were prepared by dissolving the salts in 15 ml. of water. The weight of the salt in grams is set out in Table I below:

TABLE I

| Salt: | Weight in grams |
|---|---|
| $YCl_3$ | 1.12 |
| $Mg(NO_3)_2 \cdot 6H_2O$ | 1.50 |
| $Al(NO_3)_3 \cdot 9H_2O$ | 2.19 |

The yttrium chloride was converted to the nitrate and solutions 0.1167 molar in metal ion were prepared. The urania spheres were prepared according to the process described in Example 1 and were weighed out in gram batches. Each batch was transferred to a filtering crucible. The solutions prepared above were added to the crucible. The solution was in contact with the dry urania spheres for a period of 20 minutes. The solution was then drawn off and the impregnated spheres contacted with 50 ml. of an ammonium hydroxide solution diluted with four volumes of water. The spheres were then washed with 225 ml. portions of water and dried in an oven. The sintering was carried out using the cycle described in Example 2. Samples of the spheres were submitted for analysis. The results are shown in the table below:

TABLE II

| Metal | Percent metal in spheres (by emission spectroscopy) | Density in grams/cc. | Average crush strength in pounds |
|---|---|---|---|
| Yttrium | 0.10 | 10.60 | 2.46 |
| Magnesium | 0.05 | 10.56 | 3.09 |
| Aluminum | 0.10 | 10.62 | 3.19 |

It is obvious from review of these data that inorganic ions other than zirconia can be introduced into the spheres by impregnation. The crush strength of the final products were adequate.

Obviously, many modifications and variations of the invention may be made without departing from the essence and scope thereof and only such limitations should be applied as are indicated in the appended claims.

What is claimed is:

1. A process for preparing a nuclear fuel which comprises the steps of:
   (a) preparing colloidal feeds of thoria, urania, and mixtures thereof,
   (b) forming microspheres from said colloidal suspensions,
   (c) impregnating said microspheres with a solution of an inorganic salt selected from the group consisting of salts of magnesium, aluminum, yttrium and zirconium, and
   (d) sintering said impregnated particles at a temperature above 1000° C. for at least one hour.

2. The process according to claim 1 wherein fissionable components selected from the group consisting of plutonium, uranium (233) and uranium (235) are incorporated in the microspheres.

3. The process according to claim 1 wherein the microspheres are washed with water and dried under vacuum prior to the impregnation step.

4. The process according to claim 1 wherein the sols are formed by electrodialysis of solutions of salts of thoria or urania and the microspheres are formed by dehydrating sol droplets in a column of a solvent.

5. The process according to claim 1 wherein the spheres are impregnated with a solution made to contain 1 to 50 grams of zirconyl chloride per 100 grams of solution.

6. The process according to claim 1 wherein the spheres are impregnated with a solution prepared to contain 1 to 50 grams of yttrium chloride per 100 grams of solution.

7. The process according to claim 1 wherein the spheres are impregnated with a solution prepared to contain 1 to 50 grams of magnesium nitrate solution per 100 ml.

8. The process according to claim 1 wherein the spheres are impregnated with a solution prepared to contain 1 to 50 grams of aluminum nitrate per 100 grams of solution.

References Cited

UNITED STATES PATENTS

| | | | |
|---|---|---|---|
| 3,186,949 | 6/1965 | Fitch et al. | 252—301.1 |
| 3,264,224 | 8/1966 | Fitch et al. | 252—301.1 |
| 3,320,176 | 5/1967 | Davis | 252—301.1 |
| 3,320,178 | 5/1967 | Dewell | 252—301.1 |
| 3,493,514 | 2/1970 | Ashby et al. | 252—301.1 |
| 3,501,411 | 3/1970 | Triggian et al. | 252—301.1 |

CARL D. QUARFORTH, Primary Examiner

R. L. TATE, Assistant Examiner

U.S. Cl. X.R.

252—301.1 R; 264—0.5